(No Model.)
F. E. DUCKHAM.
PNEUMATIC APPARATUS FOR CONVEYING GRAIN.
No. 530,829. Patented Dec. 11, 1894.
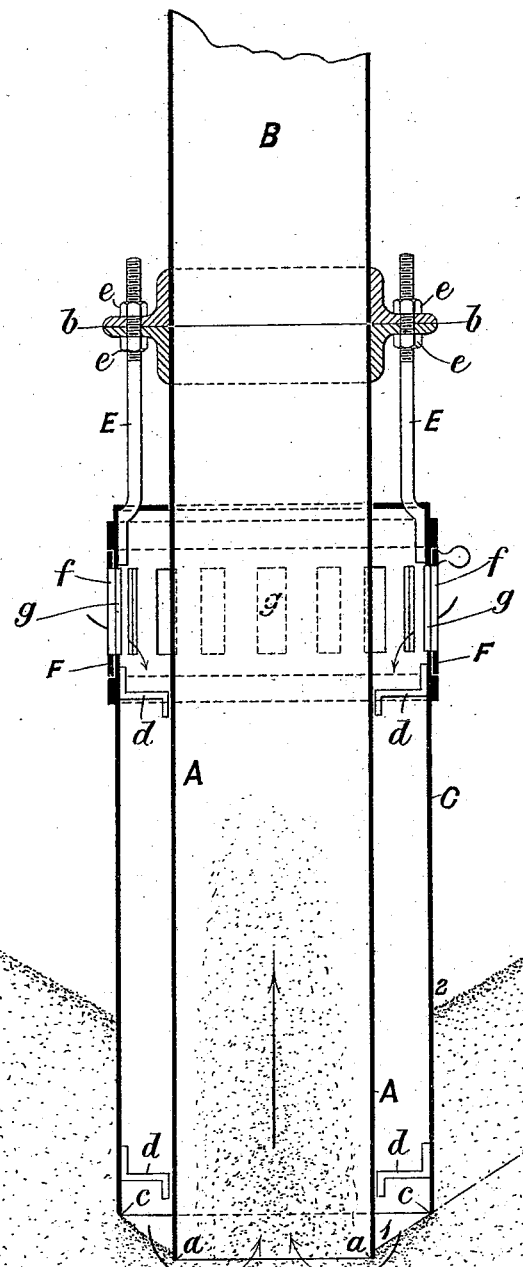
WITNESSES.
C. Sedgwick
J. N. Hanaford
INVENTOR:
F. E. Duckham
BY Munn & Co
ATTORNEYS.

United States Patent Office.

FREDERIC ELIOT DUCKHAM, OF LONDON, ENGLAND.

PNEUMATIC APPARATUS FOR CONVEYING GRAIN.

SPECIFICATION forming part of Letters Patent No. 530,829, dated December 11, 1894.

Application filed December 14, 1893. Serial No. 493,697. (No model.) Patented in British India October 28, 1893, No. 263.

*To all whom it may concern:*

Be it known that I, FREDERIC ELIOT DUCKHAM, civil engineer, of Millwall Docks, London, England, have invented new and useful Improvements in Pneumatic Apparatus for Conveying Grain and other Matters, (for which I have obtained Letters Patent in the following country, namely: British India, dated October 28, 1893, No. 263,) of which the following is a full, clear, and exact description.

My invention relates to the suction inlet nozzle of apparatus for loading, unloading, and transferring grain and other granular or pulverulent matters in bulk by an exhaust current of air, for which former Letters Patent of the United States of America were granted to me, dated the 3d day of November, 1891, No. 462,539.

As described in the specification of my previous patent aforesaid, the pendent inlet nozzle is immersed in the mass of the grain, &c., to be conveyed and the air necessary for its conveyance passes down to the inlet mouth of the nozzle through a surrounding sleeve whose lower end terminates above the mouth of the nozzle, so that there shall always be a certain depth of grain and no more (whatever the depth of immersion of the nozzle) which the air must carry along with it into the nozzle. The height above the inlet of the nozzle at which the air sleeve should terminate being dependent upon various circumstances, it is necessary to vary the relative positions of the nozzle and its air sleeve.

My present invention consists in making the air sleeve adjustable with regard to the nozzle, and providing means of adjustment therefor and means of regulating the air supplied through it to the nozzle.

Reference is to be had to the annexed drawing, forming part of this specification, which shows a vertical sectional elevation of the suction nozzle provided with an air sleeve, and with means of adjusting the sleeve and of regulating the admission of air thereto.

A is the suction inlet nozzle attached to the flexible conveying pipe B, the nozzle when in use being pendent in the position shown and immersed in the mass of the grain or other matters to be removed.

C is the air sleeve surrounding the nozzle and terminating at its lower end $c$, at a point so much higher than the mouth of nozzle A that a radial line 1—1 parallel to the angle of repose 2—2 of the grain and touching the edge $c$ of the sleeve C, will meet the side of the nozzle A at a point more or less distant from its edge, so that the grain will constantly flow beneath the edge $c$ and interpose itself in the path of, and be carried along by, the current of air passing from sleeve C to nozzle A, the depth of the mass so interposed being practically constant, whatever the depth of immersion of the nozzle, so that on the one hand the air current shall not short-circuit or rush past without carrying a proper proportion of grain, &c., with it, and on the other hand the depth of the mass shall never be so great as to obstruct the air current and cause choking of the conveying pipe.

The angle of repose 2—2 depends, however, upon the condition of the grain and varies for different kinds of grain and for different materials. It is also necessary to vary the relative height of the sleeve C to the nozzle A under different circumstances and conditions as regards the amount of vacuum available, the proportionate quantity of air required, and the height and distance to which the matters are to be conveyed. To enable the lower end $c$ of the sleeve to be adjusted relatively to the mouth $a$ of the nozzle, the sleeve C is fitted to slide upon the nozzle with which it is maintained concentric by distance pins or brackets $d$, in the annular space between them, the brackets being attached either to the sleeve or to the nozzle so as to maintain a sliding connection between their other ends and the nozzle or the sleeve, as the case may be. The adjustment of the sleeve is effected through the medium of nuts $e$ on screw-rods E, attached to the upper end of the sleeve and passing through an abutment $b$, and secured by nuts $e$, by which the position of the sleeve may be accurately regulated as required. The abutment $b$ may conveniently be formed by the flange of the joint connecting the nozzle A to the conveying pipe B, or by a bracket fixed to the upper end of the nozzle A.

F, is a regulator applied to the sleeve C near the upper end, through which air is admitted to the sleeve, the top end of which is closed. This regulator is a band fitted to turn on the sleeve and having apertures *f*, which may be made to coincide more or less with corresponding apertures *g* in the part of the sleeve surrounded by the band F.

I claim—

1. The combination, with the inlet suction nozzle of pneumatic conveying apparatus, of an air supplying sleeve surrounding the nozzle at a distance, and fitted to slide longitudinally thereon for the purpose of varying the relative height of its lower end to that of the nozzle, a relatively fixed abutment carried by the nozzle, means for adjustably connecting the sleeve to the said abutment, and spacing devices between the sleeve and the nozzle to permit of a guided movement of the former on the latter and maintain it concentric therewith, substantially as described.

2. The combination with the inlet suction nozzle of pneumatic conveying apparatus, and an abutment that is stationary relatively to the said nozzle, of an adjustable air supplying sleeve surrounding the nozzle and fitted to slide up and down thereon, screw rods connected to the sleeve and to the said abutment, and nuts screwing on the said rods, whereby the relative height of the sleeve and nozzle may be adjusted as specified.

3. The combination with the inlet suction nozzle of pneumatic conveying apparatus, of an adjustable air supplying sleeve surrounding the nozzle, and having a circumferential regulator near its upper end controlling the admission of air thereto, the sleeve being adjustably connected to the nozzle to slide longitudinally thereon, whereby the relative height of the lower end of the sleeve to that of the nozzle may be varied, substantially as specified.

Signed by the said
    FREDERIC ELIOT DUCKHAM.
In presence of—
    G. F. WARREN,
17 *Gracechurch Street, London, Notary Public.*
    T. W. KENNARD,
*Clerk to A. M. & Wm. Clark, Patent Agents,*
53 *Chancery Lane, London.*